F. VAN DOREN.
Corn Planter.
No. 84,594.
Patented Dec. 1, 1868.
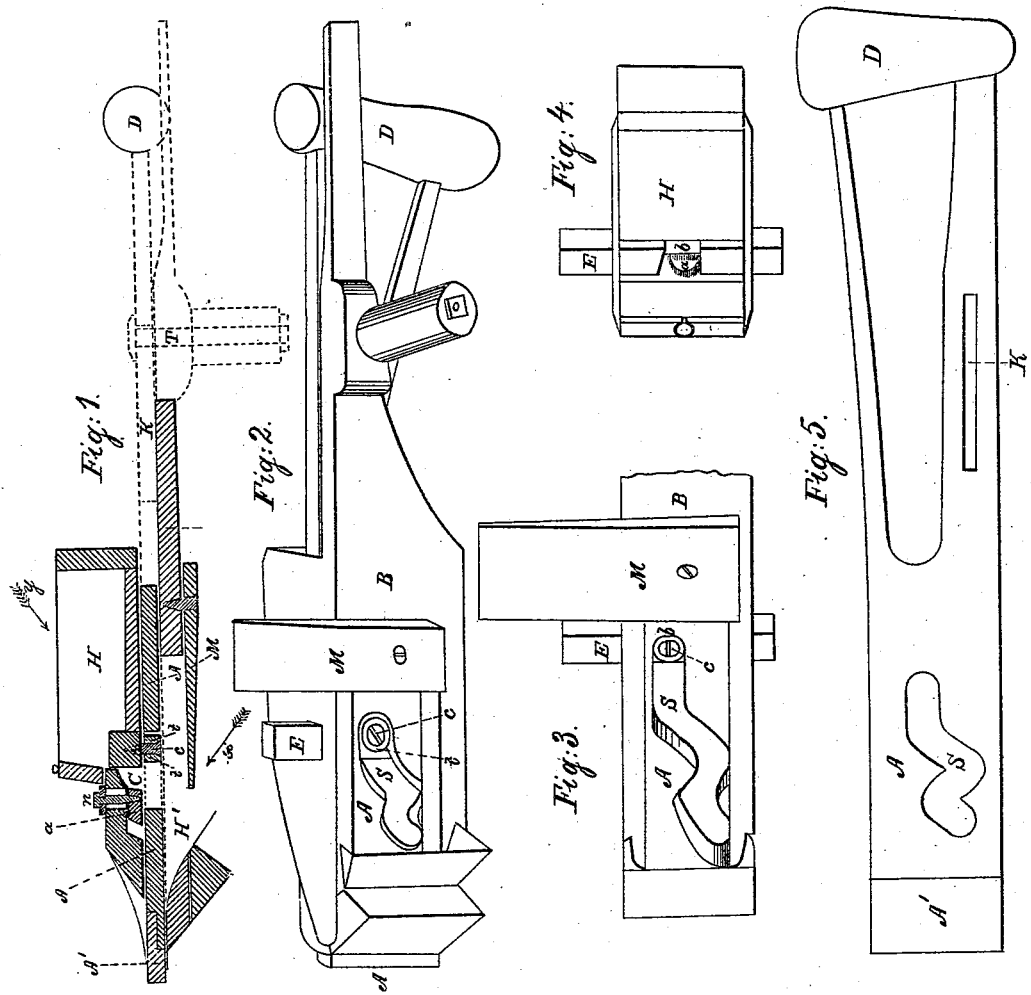
Witnesses:
Mrs Ettie Parker
J. E. Zooker
Inventor:
Francis Van Doren

FRANCIS VAN DOREN. OF ADRIAN, MICHIGAN.

Letters Patent No. 84,594, dated December 1, 1868.

IMPROVEMENT IN CORN-PLANTERS.

The Schedule referred to in these Letters Patent and making part of the same.

*To all whom it may concern:*

Be it known that I, FRANCIS VAN DOREN, of Adrian, in the county of Lenawee, and State of Michigan, have invented a new and useful Improvement in Corn-Planters; and I do hereby declare that the following is a full, clear, and exact description of the construction and operation of the same, reference being had to the annexed drawings, and to the letters of reference marked thereon, making a part of this specification.

Like letters of reference refer to similar parts.

The nature of my invention consists in the novel construction of a safe and practical device for dropping the seed from the hopper of a hand seed-planter to the ground.

To enable others skilled in the art to make and use my invention, I will now proceed to describe its construction and operation.

In the drawings—

Figure 1 represents a vertical section, passing through the centre of the instrument.

Figure 2 represents a perspective view.

Figure 3 represents an oblique view of the lower hopper, taken in the direction of the arrow $x$ in fig. 1.

Figure 4 represents a similar oblique view of the upper hopper H, taken in the direction indicated by the arrow $y$ in fig. 1.

Figure 5 represents a side view of the plunger A.

B represents the back board, with a lid, M, to open, when desirable, to see the interior of the instrument.

E represents a transverse shuttle, to agitate the seed in the hopper H, and by means of the recess $b$, cut in the shuttle, fig. 4, the seed is dropped down into the lower hopper.

Upon the raising and lowering of the plunger A, the zigzag slot S and friction-pulley $t$, on the shuttle E, cause the shuttle to slide endwise to and fro in the bottom of the hopper H.

The adjustable slide $a$ is made to slide up or down, and is held in the desired position by the set-screw $n$, and, by this device, the chamber C, between it and the shuttle, can be made correspondingly smaller or larger, to allow any number of grains or seeds to be deposited at once or in each hill.

The distance up and down, through which the plunger A is allowed to move, is measured by the length of the slot K, the ends of which, striking against the pin T, prevent it from moving too far up or down, and it is evident, from the shape of the zigzag slot S of the plunger A, that the shuttle E will be forced to make three movements crosswise of the hopper H while the plunger is being thus drawn upward.

In fig. 4 the shuttle E is represented in the position it occupies when the plunger is shoved up, its recess $b$ being brought, at this time, directly over the chamber C, which now fills with the seed.

As the plunger is now drawn upward, the seed, which had been at first measured out by the chamber C, and afterwards had fallen into the lower hopper H', drops upon the earth, and is driven down and deposited in the ground by the end of the plunger A.

As the plunger is again elevated, the chamber C is filled with seed, as before, and dropped into the lower hopper H', and thence deposited in the ground by means of the plunger A, as before.

In this manner it will be seen that successive hills are planted by the mere pressing of the lower end of the plunger into the earth by the handle D.

The object of the rapid vibratory motion of the shuttle E, caused by the zigzag slot S, is to agitate the seed, and thus prevent it from clogging in the hopper.

Having thus described my invention,

What I claim as new, and desire to secure by Letters Patent, is—

The recessed shuttle E, in combination with the adjustable slide $a$, seed-chamber C, and plunger A, all constructed in the manner substantially as set forth and described.

FRANCIS VAN DOREN.

Witnesses:
THOMAS KENNEDY,
JOHN MULLIKEN.